United States Patent
Bahlmann et al.

(10) Patent No.: US 7,769,228 B2
(45) Date of Patent: Aug. 3, 2010

(54) METHOD FOR COMBINING BOOSTED CLASSIFIERS FOR EFFICIENT MULTI-CLASS OBJECT DETECTION

(75) Inventors: Claus Bahlmann, Princeton, NJ (US); Ying Zhu, Monmouth Junction, NJ (US); Dorin Comaniciu, Princeton Junction, NJ (US); Thorsten Köhler, Deuerling (DE); Martin Pellkofer, Pentling (DE)

(73) Assignees: Siemens Corporation, Iselin, NJ (US); Siemens Aktiengesellschaft, Munich (DE)

( * ) Notice: Subject to any disclaimer, the term of this patent is extended or adjusted under 35 U.S.C. 154(b) by 458 days.

(21) Appl. No.: 11/111,640

(22) Filed: Apr. 21, 2005

(65) Prior Publication Data
US 2005/0249401 A1    Nov. 10, 2005

Related U.S. Application Data

(60) Provisional application No. 60/569,552, filed on May 10, 2004.

(51) Int. Cl.
*G06K 9/62* (2006.01)
(52) U.S. Cl. ........................ 382/155; 382/224
(58) Field of Classification Search .............. 706/39, 706/14, 43; 382/155–161, 220, 224, 165
See application file for complete search history.

(56) References Cited

U.S. PATENT DOCUMENTS 5,819,247 A * 10/1998 Freund et al. ............... 706/25
6,453,307 B1 * 9/2002 Schapire et al. ............. 706/12
6,456,993 B1 * 9/2002 Freund ....................... 706/46
6,546,379 B1 * 4/2003 Hong et al. ................. 706/14
7,076,473 B2 * 7/2006 Moghaddam ............... 706/20
7,362,919 B2 * 4/2008 Das et al. ................... 382/284
2005/0213810 A1 * 9/2005 Sabe et al. ................. 382/159

OTHER PUBLICATIONS

Wang et al., Robust Recognition Based on Adaptive Combination of Weak Classifiers, Jul. 20-24, 2003, IEEE, vol. 3, pp. 2272-2276.*
Lienhart et al., Classifying images on the web automatically, Oct. 2002, Journal of Electronic Imaging, pp. 445-454.*
Torralba et al., AI Memo:Computer Science and Artificial Intelligence Laboratory Technical Report: Sharing visual features for multiclass and multiview object detection, MIT, Apr. 14, 2004, pp. 1-18.*
Ho et al., Decision Combination in Multiple Classifier Systems, Jan. 1994,IEEE Transactions on Pattern Analysis and Machine Intelligence, vol. 16, No. 1, pp. 66-75.*

(Continued)

*Primary Examiner*—Matthew C Bella
*Assistant Examiner*—Dennis Rosario

(57) ABSTRACT

A method for training a system for detecting multi-class objects in an image or a video sequence is described. A common ensemble of weak classifiers for a set of object classes is identified. For each object class, a separate weighting scheme is adapted for the ensemble of weak classifiers. A method for detecting objects of multiple classes in an image or a video sequence is also disclosed. Each class is assigned a detector that is implemented by a weighted combination of weak classifiers such that all of the detectors are based on a common ensemble of weak classifiers. Then weights are individually set for each class.

10 Claims, 1 Drawing Sheet

OTHER PUBLICATIONS

Schapire et al., "Improved Boosting Algorithms Using Confidence-rated Predictions", Machine Learning, 37, 297-336 (1999).

Torralba A et al, "Sharing Visual Features for Multiclass and Multiview Object Detection", Massachusetts Institute of Technology, Computer Science and Artificial Intelligence Laboratory, AI Memo, No. 2004-008, Apr. 2004, pp. 1-18.

Xiao R et al, "Robust Multipose Face Detection in Images", IEEE Transactions on Circuits and Systems for Video Technology, IEEE Inc., New York, US, vol. 14, No. 1, Jan. 2004, pp. 31-41.

Viola P et al, "Rapid Object Detection Using a Boosted Cascade of Simple Features", Proceedings 2001 IEEE Conference on Computer Vision and Pattern Recognition, CVPR 2001, Kauai, Hawaii, Dec. 8-14, 2001, Los Alamitos, CA, IEEE Comp. Soc. US, vol. 1 of 2, Dec. 8, 2001, pp. 511-518.

Schneiderman H et al, "A Statistical Method for 3D Object Detection Applied to Faces and Cars", Proceedings IEEE Computer Society Conference on Computer Vision and Pattern Recognition, vol. 1, Sep. 2000, pp. 746-751.

Tieu K et al, "Boosting Image Retrieval", Proceedings 2000 IEEE Conference on Computer Vision and Pattern Recognition, Hilton Head Island, SC, Jun. 13-15, 2000, Los Alamitos, CA, IEEE Comp. Soc., vol. 1 of 2, Jun. 13, 2000, pp. 228-235.

Search Report (including Notification of Transmittal of the International Search Report, International Search Report, and Written Opinion of the International Searching Authority).

"Improved Boosting Algorithms Using Confidence-Rated Predictions", Machine Learning, 37(3), 1999, pp. 297-336.

"Robust real-time object detection", Viola et al., Technical Report CRL Jan. 2001, Cambridge Research Laboratory, 2001.

\* cited by examiner

METHOD FOR COMBINING BOOSTED CLASSIFIERS FOR EFFICIENT MULTI-CLASS OBJECT DETECTION

CROSS-REFERENCE TO RELATED APPLICATIONS

This application claims the benefit of U.S. Provisional Patent Application Ser. No. 60/569,552, filed on May 10, 2004, which is incorporated by reference in its entirety.

FIELD OF THE INVENTION

The present invention is directed to a method for combining boosted classifiers for efficient multi-class object detection, and more particularly, to a system and method for training a detection system that identifies multi-class objects using boosted classifiers.

BACKGROUND OF THE INVENTION

In recent years, the technique of boosting a set of simple or weak classifiers in order to obtain an overall strong classifier has evolved into a powerful solution, especially in the domain of image object detection. Image object detection is becoming increasing more popular and can be used in a number of different detection scenarios. Examples of such applications include face detection, pedestrian detection, traffic sign detection, and vehicle detection.

Boosting techniques are particularly effective for detecting a single object class. However, when extending this approach from the detection of one single object class to the detection of multiple object classes, its complexity scales linearly with the number of classes. Many detection applications require multiple object class detection in order to be effective. An example of such an application is vehicle detection where separate object classes may be defined for vehicles, trucks, pedestrians and traffic signs. Another example of a detection application that requires multiple object classes is people detection. Particularly, if the people are in motion, it is more effective to define people sub-classes based on the difference poses or actions of the people. For example, such sub-classes could include sitting, standing and walking.

For the task of object detection in images, a known approach uses a learning/detection framework that is based on boosting. Boosting selects and combines a set $$H = \{h_1, \ldots, h_T\} \quad (1)$$

of simple or weak classifiers $h_t: X \mapsto \{+1, -1\}$, each of it taken from a large set of classifier candidates to form a final or strong classifier. For the problem of object image detection, X is the set of all image patches, the class +1 corresponds to an object and the class −1 to a non-object. Given an additional set of weighting factors $$\alpha = \{\alpha_1, \ldots, \alpha_T\} \quad (2)$$

the object detection is solved by evaluating the strong classifier h on candidate image patches x∈X. The decision h(x) is computed from the weighted sum of the weak classifier decisions, that is, $$f(x) = \sum_{t=1}^{T} \alpha_t h_t(x) - \theta \text{ and} \quad (3)$$

$$h(x) = \text{sign}(f(x)), \quad (4)$$

where θ is a threshold allowing the user to balance false alarm and miss detection rate. An optimal selection of the weak classifiers $h_t$ and a proper weighting $\alpha_t$ is obtained from an AdaBoost training algorithm.

This technique has been applied very successfully to the detection of single class objects, for example, faces, vehicles, pedestrians, etc. However, situations exist where the detection of objects of a multitude $\{1, \ldots, L\}$ of classes within one scene is desirable, for example, a combined detection of cars, trucks, pedestrians and traffic signs in traffic scenes.

Based on the above-described algorithm, a naïve solution would use AdaBoost to train one individual ensemble of weak classifiers $H^{(l)}$ and weights $\alpha^{(l)}$ for each class l, that is, $$\{H^{(l)}, \ldots, H^{(L)}\} = \{\{h_1^{(l)}, \ldots, h_{T_l}^{(l)}\}, \ldots, \{h_1^{(L)}, \ldots, h_{T_L}^{(L)}\}\} \quad (5)$$

and $$\{\alpha^{(l)}, \ldots, \alpha^{(L)}\} = \{\{\alpha_1^{(l)}, \ldots, \alpha_{T_l}^{(l)}\}, \ldots, \{\alpha_1^{(L)}, \ldots, \alpha_{T_L}^{(L)}\}\} \quad (6)$$

The memory and computational complexity for the detection task of this approach scales linearly with L and in many cases circumvents a real-time detection system. Such a computationally extensive approach is not feasible in time, cost or efficiency to be considered as a reasonable solution. There is a need for a detection system that is capable of real-time multi-class detection and which can perform in an efficient manner.

SUMMARY OF THE INVENTION

In the present invention, a more efficient multi-class detection method and system is devised by a joint design of key components including feature and classifier design of individual detectors. In accordance with an embodiment of the present invention, a method for training a system for detecting multi-class objects in an image or a video sequence is described. A common ensemble of weak classifiers for a set of object classes is identified. For each object class, a separate weighting scheme is adapted for the ensemble of weak classifiers.

The present invention is also directed to a method for detecting objects of multiple classes in an image or a video sequence. Each class is assigned a detector that is implemented by a weighted combination of weak classifiers such that all of the detectors are based on a common ensemble of weak classifiers. Then weights are individually set for each class.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

The present invention is directed to a system and method for combining boosted classifiers for efficient multi-class object detection. The present invention is also directed to a method for training classifiers for multi-class object detection. The present invention can be used in a multitude of applications that require the detection of different objects. Such a system may, for example, be used for surveillance applications, such as for detecting and tracking a person or facial features.

The present invention could also be used to detect and track objects on an assembly line. Other applications could be created for detecting and tracking human organs for medical applications. It is to be understood by those skilled in the art that the present invention may be used in other environments as well. Another environment in which the present invention would be useful is in the detection and tracking of vehicles. In addition to detecting different types of vehicles, there is also sometimes a need for detecting pedestrians, traffic signs and other vehicle-environment related objects. For purposes of describing the present invention, it will be described in the on-road obstacle detection environment.

Figure 1:
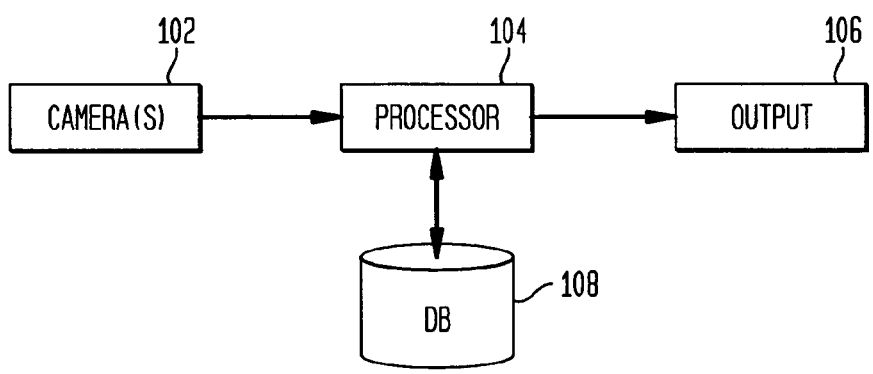
FIG. 1 is a system block diagram of a system for detecting and tracking multi-class objects in accordance with the present invention.

FIG. 1 illustrates a block diagram of a system for implementing the present invention. One or more cameras 102 are used to capture images of a road and its surroundings. As would be expected with a typical road image, the image includes background images, such as buildings, trees, and houses, and vehicles driving on the road. The images are communicated to a processor 104 which computes confidence scores using the component classifiers in a database 106. The images are analyzed in accordance with the present invention to identify different classes of objects. Examples of such objects include cars, trucks, pedestrians and traffic signs. Once an object is identified at a sufficient confidence level, the object is identified via an output device 108. The output device 108 provides an output signal which communicates to the user the presence of one or more objects. The output signal may be an audible signal or other type of warning signal. The output device 308 may also include a display for viewing the detected objects. The display provides a view of the images taken by the cameras 302 which may then be enhanced to indicate objects that have been detected and which are being tracked.

In developing a technique for efficiently detecting multi-class objects, the present invention is directed to a number of training techniques which are used to identify and select a number of weak classifiers which are then stored in database 106 and used to detect the various objects. A premise of the present invention is an underlying principle that all L detectors share a common set of features or weak classifiers. In order to retain a high detection accuracy, each individual strong classifier is adapted to its individual set of weights $\alpha^{(l)}$ posterior to the weak classifier selection. By using individual weighting there is only a minimal increase in the computation complexity compared to single class detection. The majority of the complexity derived in the computations of Equations (3) and (4) of the prior art arise from the evaluation of the weak classifiers and not the weighting.

Figure 2:
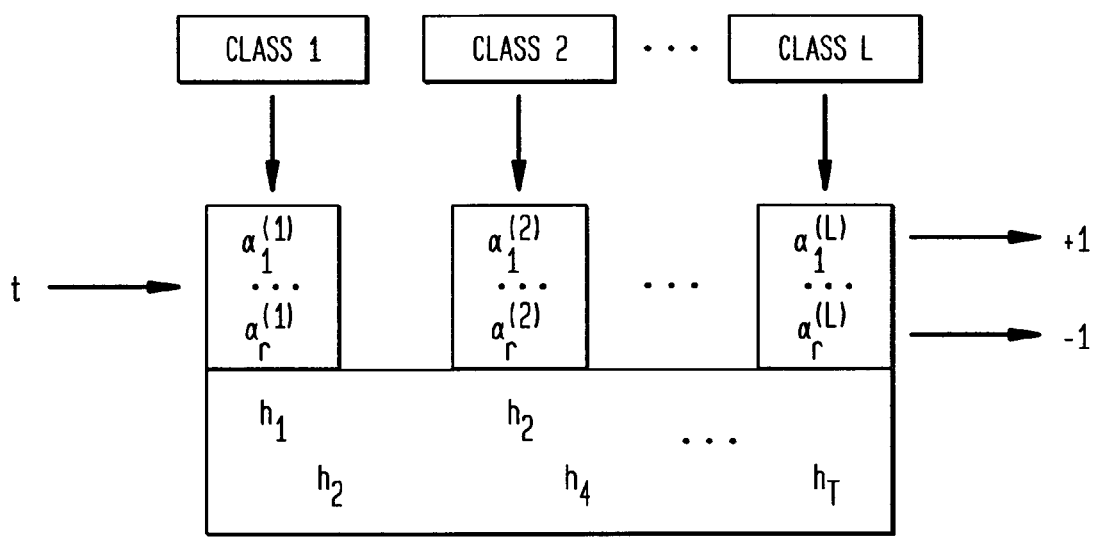
FIG. 2 illustrates a multi-class object detection framework in accordance with the present invention.

FIG. 2 illustrates a multi-class object detection framework in accordance with the present invention. Training of the system refers to the selection of a common set of weak classifiers H and the adaptation of individual weights $\alpha^{(l)}$. In accordance with the present invention, the following technique can be used to train the weak classifiers:

1. Given L object classes, select a common ensemble $H=H^{(1)}= \ldots =H^{(L)}=\{h_1, \ldots, h_T\}$ of weak classifiers.
2. for l=1, ..., L
3. Adapt $\alpha^{(l)}$ on the training set of class l using AdaBoost, where the candidate weak classifiers are given by H.

Given step 1 above, the remaining open issue is the selection of the common weak classifier ensemble H. In accordance with the present invention, three different techniques are described for selecting H. The first technique assumes that one distinguished class $l_o$ exists. The distinguished class can be, for instance, a class with a high occurrence of objects in the scene. The training set of class $l_o$ is used to select a common ensemble $$H = H^{(l_o)} = \{h_1^{(l_o)}, \ldots, h_{T_{l_0}}^{(l_o)}\} \tag{7}$$

of weak classifiers. Once the ensemble is selected, as indicated above, the individual class weights $\{\alpha^{(l)}, \ldots, \alpha^{(L)}\}$ are re-adapted using AdaBoost, where the candidate weak classifiers are taken solely from H. An example of an application where this technique might be used is a manufacturing application. Since the predominant object being detected might be an item on an assembly line the weak classifiers associated with that object would be used as the training set.

A second technique for creating a training set is used when the assignment of one distinguished class is not reasonable. In such an instance, a more symmetric procedure would be appropriate. In this approach, a common classifier H is trained based on the union of all training samples. Next, each individual classifier l is fine-tuned by adjusting $\alpha^{(l)}$ with respect to H and the positive training samples solely from class l. In other words, in this approach H is optimized in order to discriminate all positive objects from the negatives. The individual detection problem can be specialized by adapting the respective impact of the individual weak classifiers.

An example where this technique might be used is in application where the classes share some commonality. For example, facial detection uses classes that are made up of different facial poses. However, many of the classifiers for the poses are similar (e.g., eyes, nose, and mouth). Likewise, vehicle detection uses classes that are made up of different vehicles. In each case, normally certain features such as the edges and corners of the vehicle are looked at.

A third technique obtains H by collecting the most appropriate weak classifiers for each object class l. In this respect, individual sets of weak classifiers $\{H^{(1)}, \ldots, H^{(L)}\}$ are selected in a first training step. Then, the final set H is obtained from a combination of $\{H^{(1)}, \ldots, H^{(L)}\}$. One approach is to use the union $$H = \bigcup_l H^{(l)}, \tag{8}$$

other options including using the intersection of $\{H^{(l)}\}$, or using a subset of $\{H^{(l)}\}$ decided by a more complex voting scheme.

This technique is best used for applications that require a distribution of data resources. For example, in a more complex vehicle detection scheme, in addition to vehicles, the application may also detect, traffic signs and pedestrians. Additional objects that may be detected include road lanes, guard rails and background objects like trees, houses and other buildings. In such an instance, each of the classes uses weak classifiers that are distinct from the other classes. However, there still may be some common weak classifiers among all of the classes.

The framework shown in FIG. 2 can be extended to be applicable for multi-class classification. In this scenario, the classifier assigns the most probable class label î to x. A natural procedure for this task would be to choose the class with maximum activation, that is, $$\hat{l} = \arg\max_{l}\{f^{(l)}(x)\} \qquad (9)$$

with $f^{(l)}$ the activation function of class l.

The present invention uses a set of boosted weak classifiers that is common within all individual class detectors and thus has be to computed only once. A possible major loss in detection accuracy by this restriction is prevented by a posterior re-training of the weak classifier weights, individually to each object class to reduce its misclassification error. The training complexity of the present invention does not increase significantly compared to the prior art approaches since re-adjustment of the individual class weights with AdaBoost is based only on H and thus on a much small set of weak classifier candidates.

Having described embodiments for a method for using boosted classifiers to detect multi-class objects, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A computer implemented method for training a system for detecting multi-class objects in an image or a video sequence, the method performed by the computer comprising the steps of:

identifying an ensemble of weak binary classifiers that are common to a set of object classes, wherein each object class shares a common set of features with the other object classes, and wherein each feature of said common set of features is associated with a weak binary classifier in said ensemble of weak binary classifiers, for each object class, forming an individual strong classifier by adapting a separate set of weights for the ensemble of weak classifiers, wherein a same ensemble of weak binary classifiers is incorporated into each individual strong classifier by the separate set of weights for each object class, wherein said steps of identifying an ensemble of weak binary classifiers and, for each object class, forming an individual strong classifier are performed by a computer processor.

2. The method of claim 1 wherein one of the object classes is a distinguished class and the ensemble of weak classifiers are selected from the distinguished class.

3. The method of claim 2 wherein the distinguished class has a high occurrence of at least one object in the image or the video sequence.

4. The method of claim 1 wherein the ensemble of weak classifiers is learned from a data set comprising all of the object classes.

5. The method of claim 4 wherein the weights for each object class are adjusted with respect to the common ensemble of weak classifiers and positive training examples in each object class.

6. The method of claim 1 wherein the ensemble of weak classifiers is a combination of weak classifier ensembles, each of which is individually learned from a single object class.

7. The method of claim 6 wherein the combination is a mathematical union of the ensembles of weak classifiers.

8. The method of claim 6 wherein the combination is a mathematical intersection of the ensembles of weak classifiers.

9. The method of claim 6 wherein the combination of weak classifier ensembles is a subset determined by voting.

10. The method of claim 1, further comprising posterior re-training of the set of weights for each object class wherein a misclassification error is reduced.

* * * * *